US008603255B2

(12) United States Patent
Classen et al.

(10) Patent No.: US 8,603,255 B2
(45) Date of Patent: *Dec. 10, 2013

(54) DISHWASHER, IN PARTICULAR DOMESTIC DISHWASHER, AND METHOD FOR OPERATING SAID DISHWASHER

(75) Inventors: Egbert Classen, Wertingen (DE);
Helmut Jerg, Giengen (DE);
Hans-Peter Nannt, Gerstetten (DE);
Roland Rieger, Rainau (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 1142 days.

This patent is subject to a terminal disclaimer.

(21) Appl. No.: 11/990,318

(22) PCT Filed: Jul. 11, 2006

(86) PCT No.: PCT/EP2006/064108
§ 371 (c)(1),
(2), (4) Date: Feb. 7, 2008

(87) PCT Pub. No.: WO2007/017330
PCT Pub. Date: Feb. 15, 2007

(65) Prior Publication Data
US 2009/0283111 A1    Nov. 19, 2009

(30) Foreign Application Priority Data

Aug. 10, 2005 (DE) .......................... 10 2005 037 903

(51) Int. Cl.
*B08B 7/04* (2006.01)
(52) U.S. Cl.
USPC ......... 134/18; 134/25.2; 134/56 D; 134/57 D; 134/58 D; 134/104.1; 210/108; 15/1; 15/3

(58) Field of Classification Search
USPC ......... 134/18, 25.2, 56 D, 57 D, 58 D, 104.1, 134/104.4, 109, 110, 111; 210/108
See application file for complete search history.

(56) References Cited

U.S. PATENT DOCUMENTS 3,179,116 A    4/1965   Jacobs
4,346,723 A *  8/1982   Geiger ...................... 134/104.4
(Continued)

FOREIGN PATENT DOCUMENTS

CH    641 969          3/1984
DE    10046349 A1 *    3/2002
(Continued)

OTHER PUBLICATIONS

Machine Translation: DE 10046349 to Wiemer et al. Mar. 2002.*

(Continued)

*Primary Examiner* — Eric Golightly
(74) *Attorney, Agent, or Firm* — James E. Howard; Andre Pallapies

(57) ABSTRACT

A dishwasher, in particular a domestic dishwasher, having at least one substantially closed water circuit in which washing liquor is recirculated in a first direction in accordance with a program control unit, with the washing liquor being conveyed through a filter element during recirculation in order to filter impurities. Provision is made of a device for reversing the direction of flow, and this allows recirculation of the washing liquor in a second direction, which runs counter to the first direction, in order to flow through and eliminate impurities from a first screen, with the first screen being arranged in the water circuit in such a way that liquid forcibly flows through the first screen during recirculation of the washing liquor both in the first and in the second direction.

17 Claims, 6 Drawing Sheets

(56) References Cited

U.S. PATENT DOCUMENTS

Figure 1:
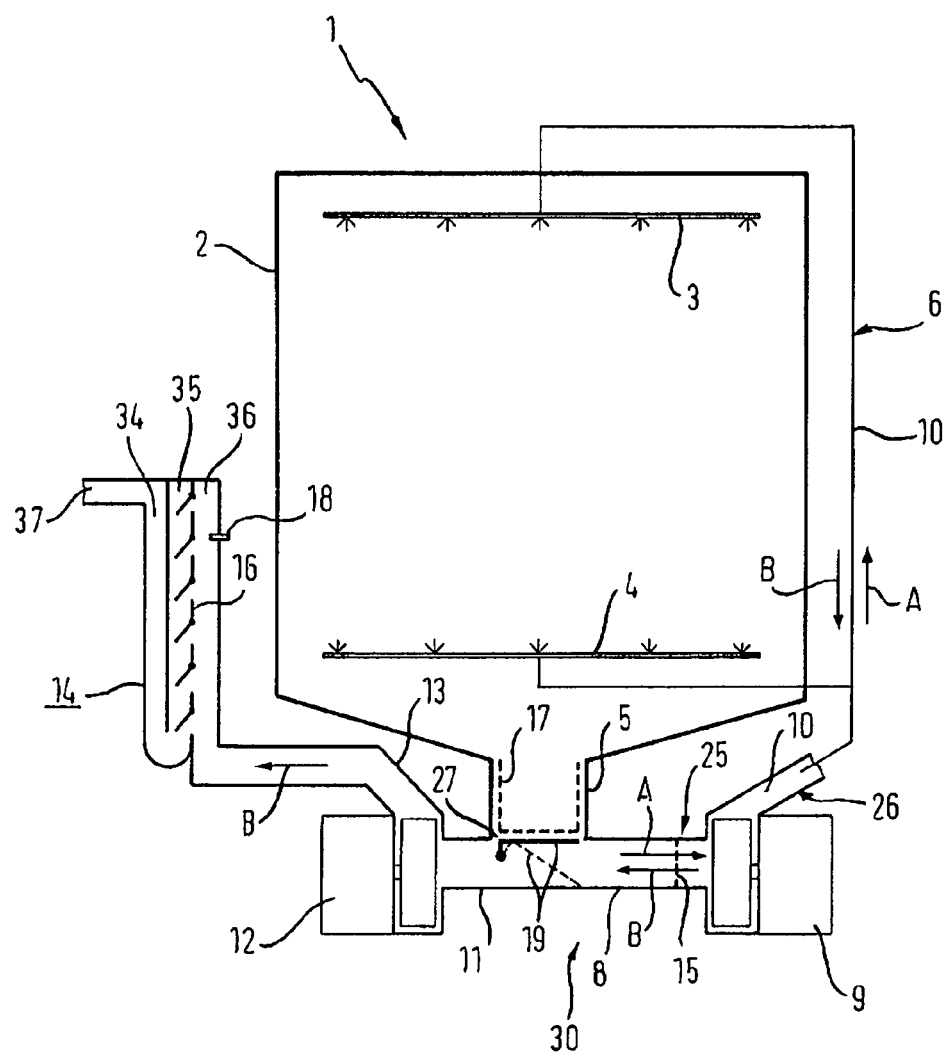

| | | | |
|---|---|---|---|
| 5,345,957 A | * | 9/1994 | Cooper et al. ............. 134/104.1 |
| 5,909,743 A | | 6/1999 | Thies et al. |
| 2004/0011726 A1 | | 1/2004 | Weh et al. |
| 2006/0005863 A1 | * | 1/2006 | Gurubatham et al. ...... 134/58 D |

FOREIGN PATENT DOCUMENTS

| | | |
|---|---|---|
| DE | 102 44 242 | 3/2004 |
| DE | 102 44 243 | 3/2004 |
| DE | 103 09 008 | 9/2004 |
| GB | 1 375 628 | 11/1974 |
| JP | 10272315 A * | 10/1998 |

OTHER PUBLICATIONS

Machine Translation: JP 10-272315 to Fujita et al. Oct. 1998.*

English translation for foreign patent JP 10272315 translated Aug. 2010.*

International Search Report PCT/EP2006/064108.

* cited by examiner

DISHWASHER, IN PARTICULAR DOMESTIC DISHWASHER, AND METHOD FOR OPERATING SAID DISHWASHER

The invention relates to a dishwasher, in particular a domestic dishwasher, having at least one substantially closed water circuit in which washing liquor is circulated in a first direction in accordance with a program control unit, the washing liquor being conveyed through a filter element during circulation in order to filter impurities. The invention also relates to a method for operating a dishwasher.

During operation of a dishwasher, depending on the degree of soiling of the items to be washed, larger and smaller impurities are removed from the items to be washed by the washing liquid. In order to prevent the impurities already removed from the items to be washed from being reapplied to the items to be washed by washing liquid circulated during a section of a wash program, in known dishwashers more or less complex filter arrangements are arranged in the area of the washing tub or of the pump well.

A filter arrangement mounted in the pump well of the dishwasher frequently consists of a coarse filter which filters large-diameter impurities out of the washing liquor, a fine filter, the mesh diameter of which lies in the range from 0.9 to 1.1 mm, and a micro filter, connected downstream of the fine filter, the mesh diameter of which is approx. 0.3 mm, in order also to filter small impurities out of the washing liquid. This arrangement can, in the manner of a parallel circuit, be supplemented by a further fine filter. The purpose of a filter arrangement of this type is, during circulation of the washing liquor, to filter as large as possible a proportion of impurities out of the washing liquor. When the washing liquor is pumped out, e.g. when switching from one section of the wash program to the next, as large as possible a proportion of the impurities is meant to be conveyed out of the wash compartment of the dishwasher so as to achieve a good washing result.

A disadvantage of this filter arrangement is that very large-area filters have to be used. This is necessary since impurities are deposited on the filters of the filter arrangement which can lead to a clogging of the filters. The large-area design of the filters can also ensure that the flow to a pump producing circulation is guaranteed. This is necessary for the reason that in the case of a conventional filter arrangement the pump generates only a small to negligible negative pressure for sucking in the washing liquor. A further requirement of large-area filters stems from the fact that the clogging of the individual filters affects the proportion of the volume flow which is directed via the main flow or via the secondary flow. A further principle-induced disadvantage is that coarse impurities are held in the pump well, as a result of which these provide an "attack surface" for the cleaning agent used in a wash cycle. This cleaning agent is thereby reduced in its effect and can no longer fully satisfy the task actually intended for it of removing soil from soiled items to be washed.

It is therefore necessary for at least some of the filter elements of the filter arrangement to be removed from the dishwasher manually by a user of the dishwasher and to be cleaned manually. In order to spare the user of a dishwasher such an unpleasant activity it would be desirable if the filter arrangement were of the self-cleaning type.

A dishwasher having a self-cleaning filter of this type is known for example from U.S. Pat. No. 3,179,116. The filter consists of a helical spring, the distances between spiral sections lying on top of one another being variably adjustable. During circulation of the washing liquid from the wash tub to the wash arms, the spring has a short length and thus small distances between spiral sections, such that impurities removed from the items to be washed are filtered by the spiral spring. When the washing liquid is pumped out, which is effected by a changed direction of rotation of the pump, the length of the spiral spring is increased, as a result of which the distance between two adjacent spring sections increases such that the impurities adhering to the spiral spring are washed by the washing fluid being pumped out into the interior of the spiral spring and finally fed to the water outlet. The changing of the length of the spiral spring is carried out by water pressure generated in the conduits, said water pressure being dependent on the rotating direction of a circulating pump. During circulation, only a low water pressure is generated in a conduit connected to the spiral spring, as a result of which the spiral spring remains shortened in length. During pumping out, on the other hand, a high pressure is generated in the conduit connected to the spiral spring, as a result of which the spiral spring is lengthened via a lever mechanism.

A disadvantage of the arrangement described is that the self-cleaning of the filter can take place only during the switch from one section of the wash program to the next. If, however, the filter is loaded with a large quantity of impurities during a section of the wash program, then sufficient washing liquid for applying to the items to be washed can no longer be circulated by the pump. The proposed arrangement therefore takes into consideration that the cleaning effect of individual sections of the wash program may be reduced. Furthermore, complete cleaning of the filter element cannot be guaranteed by the design, particularly where there are such impurities as exceed the distance between two adjacent spring sections.

Finally, from DE-OS 2 249 603, DE-OS 29 22 549 and DE 200 10 933 U1 filters for industrial use are known which have (self-) cleaning properties on account of the variable distances between or diameters of their filters.

Furthermore, from DE 103 09 008 A1 a device is known for filtering the washing liquid of a dishwasher. To reduce the water consumption of the dishwasher, a filter system is disclosed which consists of a filter and an actuating element which are arranged in a drain area. The filter is connected on the outflow side to the wash tank. Filter and actuating element are arranged on the inflow side such that the deposited soil is washed out of the dishwasher when the actuating element is open. A disadvantage of this device is that for a dishwasher which operates in accordance with the single-motor principle, i.e. in which only a single pump is provided for the draining and the wash cycle, the pump has to be designed more powerfully since, with increasing soiling, the filter increases the water resistance. As a consequence of this, the production costs of the dishwasher rise in an undesired manner and furthermore an increased noise level has to be reckoned with. Since the impurities are held in the water circuit for cleaning the items to be washed until the draining of said impurities from the dishwasher, the active efficiency of a cleaning agent is, as already explained in the introduction, diminished and is no longer available for removing impurities from the soiled items to be washed. To the extent that the impurities are therefore not regularly removed from the dishwasher, it must be expected that the cleaning performance of the dishwasher will decrease the more it is in operation.

The object of the present invention is to indicate a dishwasher, in particular a domestic dishwasher, which makes manual cleaning of a filter element used for retaining impurities superfluous, while the qualitative properties of the dishwasher with regard to power consumption and cleaning performance will be optimized. Furthermore, a method for operating a dishwasher of this type will be indicated.

This object is achieved in a dishwasher according to the invention, in particular a domestic dishwasher, which has at least one substantially closed water circuit in which the washing liquor is circulated in a first direction in accordance with a program control unit, the washing liquor being conveyed through a filter element during circulation in order to filter impurities. According to the invention, a device is provided for reversing the direction of flow, which enables circulation of the washing liquor in a second direction, opposite to the first direction, so as to flow through and remove impurities from a first filter, and in which the first filter is arranged in the water circuit in such a way that the washing liquor is or can be forced to flow though this filter during circulation of the washing liquor both in the first and in the second direction.

The object is also achieved in a method for operating a dishwasher, in particular a domestic dishwasher, in which in a substantially closed water circuit the washing liquor is circulated in a first direction in accordance with a program control unit and is conveyed through a filter element during circulation in order to filter impurities, a reversal of the direction of flow of the washing liquor through the first filter being effected in order to clean the first filter, such that the washing liquor is conveyed through the first filter in a second direction, running counter to the first direction.

The arrangement of the first filter in a section of the water circuit which the washing liquor is forced to flow through irrespective of the direction of flow of the washing liquor during a circulating cycle allows construction of a dishwasher with a simple design, as a conventional filter arrangement consisting of coarse, fine and micro filter on the floor of the wash compartment can be dispensed with. The arrangement of the first filter in a section which the washing liquor is forced to flow through therefore ensures that during operation of the dishwasher this filter is covered with impurities more rapidly compared with conventional filter arrangements. For this reason, a self-cleaning of the first filter is provided which is effected by a reversal of the direction of flow of the washing liquor through the first filter. Due to the fact that the washing liquor flows through the first filter in an opposing direction during a cleaning cycle of the filter, a reliable and effective cleaning of the first filter is effected.

Advantageous embodiments emerge from each of the dependent claims.

To achieve the forced through-flow of the first filter by the washing liquor, a first embodiment of the invention provides for the first filter to be arranged in a conduit connecting a pump well and a pump in the suction area of the pump. Provision can alternatively be made for the first filter to be arranged in a conduit connecting the pump and spray devices, e.g. spray arms, in the pressure area of the pump. In contrast to conventional filter arrangements which are arranged in the area of the wash tub or the pump well and are not located in the suction area of the pump, the first filter is arranged in relative proximity to a suction or pressure area of the pump effecting circulation. A flowing through of the first filter with washing liquor and depositing of impurities on said filter is always guaranteed when the pump is in operation. In contrast hereto, in conventional filter arrangements use of the pump for the flowing through of the filter arrangement is not needed as the gravity principle is used here. In the event of the conventional filter arrangement being covered to excess with impurities, this can therefore result in the pump running idly, in which case washing liquid can no longer flow into the suction area.

In a further embodiment, the first filter is embodied as a variable filter which during circulation of the washing liquor in the first direction has a different mesh width from that during circulation of the washing liquor in the second direction. It is particularly advantageous if the mesh width during circulation of the washing liquor in the first direction is less than the mesh width during circulation of the washing liquor in the second direction. This on the one hand brings about good filtering of impurities from the washing liquor and on the other simplifies cleaning of the filter during operation in the reverse direction of flow, i.e. when the through-flow is in the second direction.

In order to achieve as good as possible a cleaning effect of the washing liquor during circulation in the first direction, provision is made according to a further embodiment for the filter to be embodied as a microfilter during circulation of the washing liquor in the first direction. The concept of the microfilter is to be understood to mean that the mesh width of the first filter during circulation of the washing liquor in the first direction is dimensioned in accordance with the mesh width of a microfilter of a conventional filter arrangement.

In a further embodiment provision is made for the coverage of the first filter with impurities to be determined by sensor, in order to initiate a reversal of the direction of flow in the event of a predetermined parameter threshold value being exceeded. As a parameter for monitoring the coverage of the first filter, e.g. the pressure prevailing in the suction and/or pressure area of the pump is used, which can be determined by an appropriately designed sensor. Alternatively or additionally, the rotational speed of the pump can be used as a parameter for monitoring the coverage of the first filter. Depending on the setting of the predetermined parameter threshold value or values, reversal of the direction of flow can be initiated even where coverage of the first filter with impurities is still low. The setting of the parameter threshold value or values can be determined by one skilled in the art through corresponding trials.

In a further embodiment, provision is made that a soil reservoir actively connected to the first water circuit is provided for receiving the impurities removed from the first filter, when this filter is flowed through in the second direction. The soil reservoir serves as a temporary "intermediate storage" for impurities. Once the impurities are deposited in the soil reservoir, these impurities are arranged outside the first water circuit, as a result of which the active efficiency of the cleaning agents used for cleaning cannot be impaired. In addition, the provision of a soil reservoir makes it possible for the volume of washing liquor which was needed for conveying the impurities to the soil reservoir to be recovered for the further sections of the wash program.

To this end, it is advantageous if in accordance with a further embodiment a second filter is arranged in the soil reservoir. The second filter is preferably arranged in the soil reservoir in a vertical orientation so as to facilitate the recovery of washing liquor for the further sections of the wash program. The vertical orientation effectively prevents it from being possible for the second filter to be covered with impurities such that a further through-flow of washing liquor is prevented.

The second filter is preferably embodied as a variable filter that has a different mesh width according to the direction of through-flow. A self-cleaning effect of the second filter can be provided by this means.

In a further embodiment, the soil reservoir is arranged in a second water circuit of the dishwasher such that the washing liquor flowing into the soil reservoir can be fed back, freed of impurities, via an intake aperture into the wash compartment or into the pump well. By this means, a dishwasher can be provided in a simple manner which has only a low consumption of water and cleaning agent to carry out a wash cycle.

A further embodiment provides that in the soil reservoir a sensor for determining the fill level in the soil reservoir is provided whose output signal can be fed to a program control unit for controlling the reversal of flow. The sensor can be embodied in the form of a float, for example. The sensor serves to terminate the reversal of flow before the maximum fill level of the soil reservoir, which is actively connected to the outlet of the dishwasher and to a domestic sewer connection, is reached.

In order to be able to influence the direction of flow through the second filter in the soil reservoir, it is furthermore advantageous if the soil reservoir has at least one actuating element. The choice of flow direction through the second filter fixes whether this filter is to take on a filtering function for the intermediate storage of impurities and recovery of the washing liquor or whether the second filter is as part of a draining cycle of the washing liquor (e.g. after termination of a wash program section) to be subjected at the same time to self-cleaning. It can also be determined by the at least one actuating element whether the washing liquor located in the soil reservoir is to be fed back, freed of impurities, into the water circuit of the dishwasher.

For this purpose, according to a further embodiment a first actuating element is provided for closing the intake aperture connecting the soil reservoir and the wash compartment. The at least one actuating element can be shifted, optionally steplessly, in a flow-controlled or actuator-controlled manner, e.g. by a servomotor, a memory metal or similar, between an open and a closed position. A further embodiment provides that a second actuating element is provided as a directing means in order to convey the washing liquor conveyed into the soil reservoir optionally to the one side or to the other of the second filter. The function as defined of the second filter in the soil reservoir can be accomplished through coordinated operation of the actuating elements provided.

A further embodiment of the dishwasher according to the invention comprises a variable mesh width of the first and/or the second filter by means of an actuator or by means of the direction of flow through the filter concerned. A particularly simple and low-cost design is achieved if the mesh width can be produced solely by changing the direction of flow as any control means can then be dispensed with. It is possible by this means to make a very low-cost dishwasher available.

Provision is made in a further embodiment for a flow-controlled or actuator-controlled closing flap to be arranged at an outlet of the pump well, which flap reduces when closed the effective flow area to a predetermined dimension. The position of the closing flap is dependent on the direction of flow of the washing liquor. If the washing liquor is to be circulated in the first direction in the substantially closed water circuit, then the closing flap is opened such that the washing liquor located in the pump well can be fed to the pump for further circulating without increased resistance. If on the other hand the washing liquor is circulated in a second direction to clean the first filter, then it is advantageous if the closing flap closes the outlet of the pump well at least partially such that the desired forced through-flow through the first filter is ensured. Depending on the embodiment of the device for reversing the direction of flow, the situation could otherwise arise whereby a disproportionately large proportion of washing liquor is conveyed out of the pump well, but which would make no contribution toward removing soil from the first filter. On the other hand, it has proven advantageous for the outlet of the pump well not to be closed completely by the closing flap, so as to prevent the device for reversing the direction of flow from running idly once the washing liquor located in the first water circuit has in an exhaustive manner been conveyed in a second direction. The volume of water available for cleaning the first filter corresponds substantially to the volume located in the feed lines to the spray devices.

A further embodiment provides for arranging a further filter, in particular a coarse filter, in the pump well in order to prevent impurities of a given size from ingressing in the direction of the flow-generating elements.

In a further embodiment, the device for reversing the direction of flow can be formed by the pump. The reversal of the direction of flow could be brought about by an altered direction of rotation of the pump. Depending on the embodiment, the pump can have e.g. one or more impellers in a circulating section and a soil-removing section of the conduits connected to the pump outlet. Alternatively, the device for reversing the direction of flow can be formed by a second pump, the (first) pump arranged in the circulating section representing a circulating pump and the (second) pump arranged in the soil-removing section representing a discharge pump of a conventional type.

A particularly good cleaning of the first filter is produced if the device for reversing the direction of flow can be operated in a pulsed manner e.g. by a program control unit for an improved removal of soil from the first filter.

In one embodiment of the inventive method, during the circulation of washing liquor through the first filter in the first direction, the soiling of the first filter is determined and when a predetermined threshold value of soiling of the first filter is reached, reversal of the direction of flow through the filter element is effected. The cleaning of the first filter occurs according to this embodiment independently of the wash program sections fixed in other respects and can therefore be undertaken at any arbitrary time.

Here, it is further provided, as described previously in connection with the dishwasher according to the invention, that the flow cross-section through the first filter is increased during reversal of the direction of flow so as to ensure efficient cleaning of the first filter.

The determining of the soiling of the first filter can be carried out by sensor by monitoring the rotational speed of a pump effecting the circulation or the pressure (on the suction or pressure side) of the washing liquor prevailing in the proximity of the pump.

Alternatively, it can also be provided that the implementing of the reversal of the direction of flow be effected in a program-controlled manner at predetermined times in a wash program sequence.

A further embodiment of the method according to the invention provides that the washing liquor conveyed in a second direction is conveyed through a second filter arranged in the soil reservoir. When the washing liquor conveyed through the second filter is fed, freed of impurities, to the dishwasher again, a resource-saving wash can be carried out.

The washing liquor freed of impurities can be fed back to the wash compartment via an intake aperture connecting the soil reservoir to the wash compartment or, in one embodiment after shutting down the reversal of flow, via the conduit connecting a pump well to the soil reservoir into the pump well.

Figure 2:
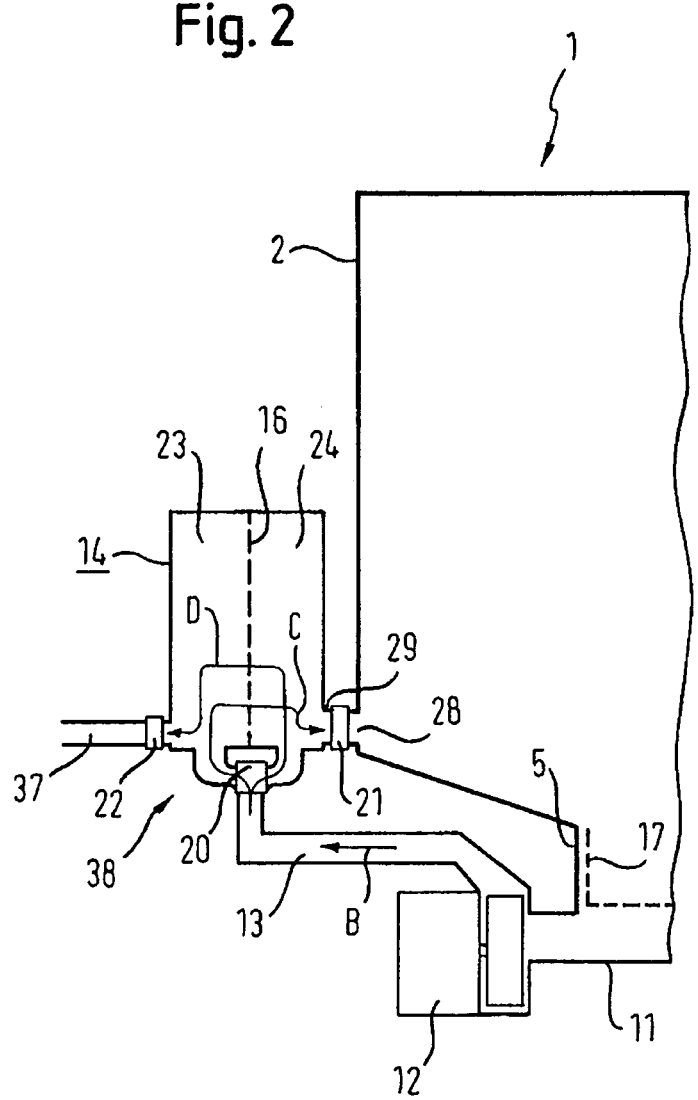
Figure 3A:
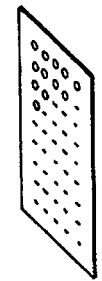
Figure 3B:
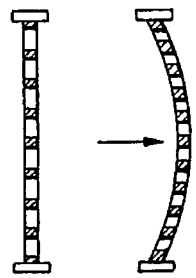
Figure 4:
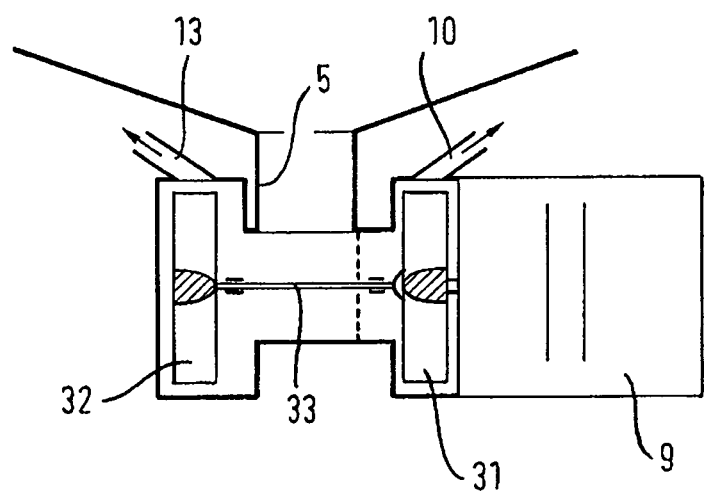

The invention and advantages thereof will be explained in detail below with reference to the drawings, in which:

FIG. 1 shows a schematic diagram of a first exemplary embodiment of a dishwasher according to the invention, FIG. 2 shows a schematic diagram of a second exemplary embodiment of a dishwasher according to the invention, FIG. 3a) shows the representation of a conventional filter having a fixed mesh width, FIGS. 3b) to 3g) show various exemplary embodiments of variable filters, and FIG. 4 shows a device for reversing the direction of flow embodied in a single pump.

FIG. 1 represents a first embodiment of a dishwasher 1 in a schematic view. The dishwasher 1 comprises substantially a wash compartment 2 in which items to be washed (not shown) are arranged, a washing liquor or water circuit 6, a water intake (not shown in detail in the Figure) and a drain 37. The items to be washed are arranged in the wash compartment between wash or spray arms 3,4. A wash tub is arranged below the items to be washed and the spray arms 3,4, which wash tub guides washing liquor present in the wash compartment 2 into a pump well 5. The pump well 5 is part of the washing-liquor circuit 6 in which the washing liquor needed for a wash cycle is circulated.

During a wash cycle, which can comprise the program sections pre-wash, clean, intermediate wash and rinse controlled by the program control unit, washing liquor is taken from the pump well 5 via a conduit 8 and directed via a first filter 15 arranged in the conduit 8 to a pump 9. From the pump 9, the washing liquor is directed after running through a through-flow heater (not shown) via a conduit 10 to the spray arms 3,4 and from these sprayed into the wash compartment. In the wash compartment 2 the washing liquor then runs via the wash tub back into the pump well 5. Consequently, during the course of a wash program, the first direction of flow of the washing liquor marked with the reference character A emerges.

The first filter 15 is arranged directly in the main flow, in the present FIG. 1 in a suction area 25 of the pump 9. In contrast to the representation in the drawing, the filter 15 could also be arranged in the conduit 10 in a pressure area 26 of the pump 9. The spatial proximity of the filter 15 to the pump 9 gives rise upon operation of the pump 9 to a forced through-washing of the first filter 15. By this means, this filter is, depending on the soiling of the items to be washed, covered with impurities and reduces the effective cross-sectional area. This leads to a fall in pressure in the suction or pressure area 25,26 of the pump 9 which can be detected by sensor. At the same time, the rotational speed of the motor of the pump 9 rises to a slight extent as this motor, due to the reduced conveyed volume flow, goes to a different operating point on a pump p-Q characteristic curve. The fall in rotational speed can also be detected by known sensors.

These two parameters—an altered pressure in the suction or pressure area 25,26 of the pump 9 and/or an altered rotational speed of the pump 9—or alternatively or additionally a monitored fill level in the pump well 5 can be used as sensor variables in order to monitor the covering of the first filter 15 with impurities. To this end, threshold values for the respective parameters can be set, for example in the program control unit (not shown in the Figure), or an exceeding or underrunning of the threshold value monitored.

Once this criterion is satisfied, then a reversal of the direction of flow of the washing liquor is initiated. To do this in the exemplary embodiment according to FIG. 1, the pump 9 is switched off and a pump 12, which may take the form of a conventional discharge pump, connected via a conduit 11 to the pump well 5 is switched on. Operation thereof gives rise in the washing-liquor circuit 6 to a second direction of flow of the washing liquor, marked with the reference character B. Through operation of the pump 12, the impurities deposited on the first filter 15 and facing the pump well 5 are sucked off, thereby effecting a cleaning.

In order to prevent washing liquor located in the pump well 5 from being sucked by the suction generated by the pump 12 instead of the washing liquor located in the first washing-liquor circuit 6, a closing flap 19 is arranged at an outlet 27 of the pump well 5, which flap assumes during reversal of the direction of flow the position shown by the solid line and otherwise the position represented by the broken line. In principle, the closing flap 19 can fully seal the outlet 27 of the pump well 5 such that no washing liquor can be sucked from this pump well into the conduit 11. It has, however, proven to be advantageous to seal the outlet 27 of the pump well 5 only partially such that the flow resistance from the pump well in the direction of the conduit 11 is greatly increased. For if the washing liquor located in the washing-liquor circuit 6 (i.e. in the spray arms and in the conduits up to the pump 12) is sucked out fully then washing liquor located in the pump well 5 can subsequently flow into the conduit 11 such that idle running of the pump 12 is avoided.

The washing liquor sucked by the pump 12, including the impurities in the conduits 8 and 11 and deposited on the first filter 15, is guided via a conduit 13 into a soil reservoir 14.

The soil reservoir 14 comprises a second filter 16 and is connected to the drain 37. In the Figure, the second filter 16 is equipped by way of example with flaps such that, when flow resistance is low, the impurities are borne in the direction of the drain. Since the soil reservoir 14 in the present example is constructed according to the principle of communicating pipes, a uniform water level is produced in all three sub sections 34,35,36, which level can be monitored by a sensor 18 (e.g. a float). When the sensor level is reached, the pump 12 is switched off, as a result of which a pressure acting counter to gravity in the conduit 13 is decreased. Due to this, the flaps of the second filter 16 close such that the impurities located in the Figure in the soil reservoir sections 34,35 are held in the soil reservoir 14. Due to deliberate permeabilities in the flaps or a corresponding installation section of respective flaps, the washing liquor flows back via the soil-reservoir section 36, the conduit 13 and the conduit 11 in the direction of the water circuit 6. However, here the washing liquor exhibits a high degree of purification. In this way, a recovery of the washing liquor is provided, as a result of which only small quantities of water have to be supplied for the further wash program sequence.

If the pump 12 is operated continuously, i.e. in disregard of the signal delivered by the sensor 18, then the water located in the soil reservoir is pumped together with the impurities into the drain 37.

Thus, a control circuit which recognizes when the first filter 15 in the washing-liquor circuit 6 is covered with impurities is created and an automatic cleaning of the first filter and the removal of the soil is initiated. This circuit is initiated depending on the degree of soiling and quantity of soil deposited on the first filter. This means that the first filter is automatically cleaned more frequently when there is a greater amount of soil to deal with.

Since impurities—depending on the sensitivity of the impurity detection of the first filter 15—are removed early from the washing-liquor circuit 6, it is possible to operate the dishwasher 1 with a reduced quantity of cleaning agents as their effectiveness is not impaired by soil located in the water circuit. A further advantage of the inventive arrangement of the first filter 15 is that the pump well 5 can be built smaller, thereby reducing the quantity of dead water. A conventional filter arrangement in the area of the wash-compartment floor and in the pump well can essentially be dispensed with, it being advantageous if—as inscribed in FIG. 1—a second filter 17 is provided in the form of a coarse filter in the pump well 5 in order to keep coarse impurities away from the first filter 15. Due to the forced through-flow of the first filter 15, this filter can, compared with conventional filter arrangements, be fashioned substantially smaller. Furthermore, a reduction of water is produced as a soil detection is integrated and the impurities are transported away without the need for carrying out a complete change of water.

Instead of a float, an overflow can take over the function of regulating the level in the soil reservoir 14. This can be designed in the manner of a settling tank so that soil separation is also provided here. In this variant, a foam filter can also be used to aid the filtering.

In another embodiment, it is also possible for the self-cleaning of the first filter 15, i.e. a reversal of the direction of flow (to the second direction B) to be linked to the sequence of the wash program currently running such that at least one self-cleaning of the first filter 15 is carried out in each wash cycle.

FIG. 2 shows a second exemplary embodiment of a dishwasher according to the invention, which differs in terms of layout and the connection of the soil reservoir 14. The soil reservoir 14 is connected via a water directing means 38 having an actuating element 20 to the conduit 13. Via the water directing means 38 washing liquor conveyed from the pump 12 in the conduit 13 in direction of flow B can optionally be guided into a soil reservoir volume 23 or a soil reservoir volume 24 of the soil reservoir 14. The soil reservoir volume 23 is connected via an actuating element 22 to the drain 37. The soil reservoir volume 24 is connected via an actuating element 21 in a conduit 29 to an intake aperture 28 of the wash compartment 2. All actuating elements 20,21,22 can be controlled through the program control unit of the dishwasher 1.

During operation of the dishwasher 1 in reverse direction of flow, the washing liquor is conveyed by means of corresponding positioning of the actuating element 20 into the soil reservoir volume 23. The actuating element 22 seals the access to the drain 37 while the actuating element 21 is open. In this way, the washing liquor furnished with impurities is cleaned at the filter 16 and can flow back via the soil reservoir volume 24 and the intake aperture 28 into the wash compartment 2. When the impurities which have accumulated in the soil reservoir volume 23 are to be removed from the soil reservoir 14, then the washing liquor is guided with the actuating element 21 closed into the soil reservoir volume 24. if the actuating element 22 is open simultaneously, the washing liquor, together with the impurities located in the soil reservoir volume 23, is pumped into the drain 37 and into a domestic drain (not shown). Self-cleaning of the filter 16 is ensured in this way.

In order to achieve a high level of efficiency of the first and/or second filter 15,16, it is advantageous if these filters are fashioned as variable filters. If the dishwasher is being operated normally, i.e. if the washing liquor is being conveyed in a first direction A through the first filter 15, then as good as possible a filtering of the washing liquor is desired. The first filter is therefore in this direction preferably fashioned as a microfilter. Cleaning is, however, simplified if the first filter 15 has in a second direction of flow B a different, larger mesh width. This applies correspondingly to the second filter 16, in direction of flow C a high filtering effect based on a small mesh width being desired and in direction of flow D a larger mesh width being desired for a high self-cleaning effect.

Represented in FIGS. 3b) to 3g) are various exemplary embodiments of variable filters, which can be used as filter 15 and 16 in the present invention. In FIG. 3a) the filter is for comparison fashioned as a filter with defined openings. Dirt particles can clog the openings and are difficult to remove.

FIG. 3b) shows a flexible filter which, based upon a defined wall strength and at a given flow resistance is fashioned flexibly. By this means, the hole geometry and thus the mesh width changes. In the flexed condition the filter therefore has a lower mesh width and thus improved filtering.

Figure 3C:
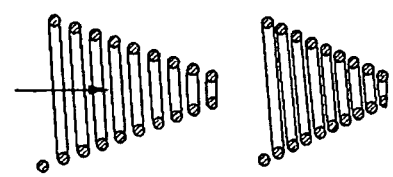

The filter according to FIG. 3c) is fashioned as a conical spring body of coiled wire windings. The distance between adjacent winding sections changes due to the flow resistance. Thus, depending on the direction of flow, improved or reduced filtering is provided. The wire of the spring body could also be fashioned from a corrugated wire in order to obtain a basic opening when the winding sections are pressed against one another due to the direction of flow.

Figure 3D:
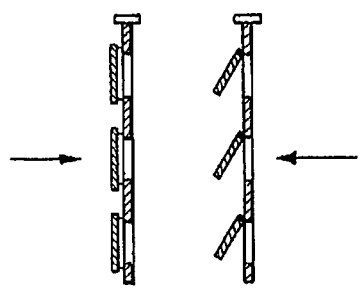

A particularly simple embodiment of a variable filter is represented in FIG. 3d). A plurality of flaps, which close or open depending on the direction of flow, is arranged on a parent body. The flaps can have small bars at the sides so as to provide a base aperture. The flaps themselves can also be furnished with small-diameter perforations so as to provide a desired base aperture.

Figure 3E:
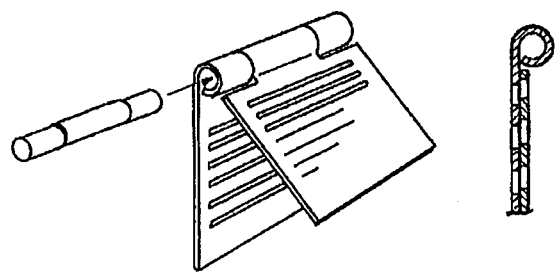

FIG. 3e) shows a similar embodiment in which a flap with longitudinal slots fashioned by way of example is arranged over a plate with longitudinal or lateral slots. The opening and closing of the flap is effected by the respective direction of flow, the cross-section varying depending on the position of the flap. The base size of the filter openings could additionally be adjusted via adjustable cams.

Figure 3F:
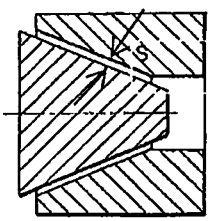

In the embodiment according to FIG. 3f) a cone is guided into a correspondingly fashioned counterpart. Depending on the position of the cone relative to the counterpart, the aperture gap s can be varied. By this means, a selectively free aperture can be adjusted in an adjustable way. The marginal zone of the cone or of the counterpart can be furnished with small bars or such like so as to ensure a base aperture. Actuation of the cone relative to the counterpart can be realized by means of any actuator or a memory metal.

Figure 3G:

FIG. 3g) shows two filter plates, each with apertures. The effective cross-section is varied through movement against one another. Actuation can likewise be effected via a randomly configured actuator or a memory metal.

In the exemplary embodiments according to FIG. 1 and FIG. 2, dishwashers are depicted in which the device 30 for reversing the direction of flow is in the form of a circulating pump 9 and a discharge pump 12. In another embodiment, which is represented schematically in FIG. 4, the device for reversing the direction of flow is possible by means of just a single pump 9. Two impellers 31,32, which are arranged in spatial proximity to the conduit 10 or 13 respectively, are mounted on a shaft 33 driven by a motor. The motor of the pump 9 is reversible in its direction of rotation. The two impellers are each connected via a free-wheeling mechanism (not shown in detail in the Figure) to the shaft 33 such that the impeller 31 is driven by the shaft 33 when the motor moves in one direction, while the other impeller 32 remains unmoved. In the reverse direction of rotation of the motor, on the other hand, the impeller 32 is driven by the shaft 33, while the impeller 31 stands still.

Besides a free-wheeling mechanism, the driving of the respective impellor can be produced by an actuator, a memory metal, a magnet or in a motor-driven manner. In this embodiment it is useful for the motor to be designed more powerfully so that small solids such as e.g. toothpicks and the like are reduced in size by means of a powerfully fashioned impeller 32 or a special cutter, for example also fastened to the shaft, without the discharge process becoming blocked in the direction of the conduit 13.

LIST OF REFERENCE CHARACTERS

1 dishwasher
2 wash compartment/wash chamber 3 spray arm
4 spray arm
5 pump well
6 washing-liquor circuit
7 washing liquor/washing liquid
8 conduit
9 pump (circulating pump)
10 conduit
11 conduit
12 pump (discharge pump)
13 conduit
14 soil reservoir
15 filter
16 filter
17 filter
18 sensor
19 closing flap
20 actuating element
21 actuating element
22 actuating element
23 soil reservoir volume
24 soil reservoir volume
25 suction area
26 pressure area
27 outlet of the pump well
28 intake aperture
29 conduit
30 device for reversing the direction of flow
31 impeller
32 impeller
33 shaft
34 soil reservoir section
35 soil reservoir section
36 soil reservoir section
37 drain
38 water directing means
A direction of flow of the washing liquor
B direction of flow of the washing liquor
C direction of flow of the washing liquor
D direction of flow of the washing liquor

The invention claimed is:

1. A dishwasher, comprising:
   a water circuit;
   a program controller for selecting one of a first flow direction of washing liquor in the water circuit and a second flow direction that is counter to the first flow direction;
   a first filter in the water circuit;
   a flow reversing device for reversing the direction from the first flow direction to the second flow direction in response to a selection by the program controller;
   a soil reservoir connected to the water circuit for receiving impurities removed from the first filter by liquid flowing through the first filter in the second flow direction;
   a second filter in the soil reservoir, the second filter and the first filter being different filters; and
   a first actuator that reverses a direction of flow through the second filter between a filtering direction and a filter flushing direction, the filter flushing direction being opposite to the filtering direction,
   wherein washing liquor flows through the first filter both in the first flow direction and in the second flow direction, and
   the washing liquor flows through the second filter in both the filtering direction and the filter flushing direction.

2. The dishwasher of claim 1, wherein the first filter is in one of a conduit connecting a pump well and a pump in a suction area of the pump and a conduit connecting a pump and a spray device in a pressure area of the pump.

3. The dishwasher of claim 1, wherein the first filter is a variable filter which has a different mesh width during circulation of the washing liquor in the first flow direction than a mesh width during circulation of the washing liquor in the second flow direction.

4. The dishwasher of claim 1, wherein the first filter is a microfilter.

5. The dishwasher of claim 1, further including a sensor that determines an impurity coverage of the first filter and wherein the flow reversing device reverses the direction of flow when a predetermined threshold is exceeded.

6. The dishwasher of claim 5, wherein one of a pressure prevailing in a suction or a pressure area of a pump and a rotational speed of the pump is used as a parameter for determining the impurity coverage of the first filter.

7. The dishwasher of claim 1, wherein the second filter is a variable filter which has a different mesh width depending on the direction of flow through the second filter.

8. The dishwasher of claim 1, wherein the soil reservoir is in a second water circuit of the dishwasher such that the washing liquor flowing into the soil reservoir can be directed, freed of impurities, via an intake aperture back into a wash compartment or into a pump well.

9. The dishwasher of claim 1, wherein the soil reservoir includes a sensor that determines a fill level in the soil reservoir, the output signal of which sensor is fed to the program controller for selecting the flow direction.

10. The dishwasher of claim 1, further comprising a second actuator that closes an intake aperture connecting the soil reservoir and a wash compartment.

11. The dishwasher of claim 10, further comprising a third actuator that closes an outlet aperture connecting the soil reservoir to a drain.

12. The dishwasher of claim 1, wherein a mesh width of the first filter can be altered by an actuator or by the direction of flow through the first filter.

13. The dishwasher of claim 1, further including a flow-controlled or actuator-controlled closing flap at an outlet of a pump well, wherein the flap reduces an effective flow area to a predetermined dimension in a closed position.

14. The dishwasher of claim 1, further including a third filter in a pump well, the third filter being positioned for filtering all washing liquor that flows through the first filter.

15. The dishwasher of claim 1, wherein the flow reversing device is a pump.

16. The dishwasher of claim 1, wherein the flow reversing device in a pulsed manner for improved soil removal from the first filter.

17. A method for operating a dishwasher, the method comprising:
   circulating washing liquor in a water circuit in a first flow direction in accordance with a program controller through a first filter;
   reversing the direction of flow of the washing liquor through the first filter from the first flow direction to a second flow direction that is counter to the first flow direction;
   receiving in a soil reservoir connected to the water circuit impurities removed from the first filter when liquid flows through the first filter in the second flow direction; and
   reversing with a first actuator a direction of flow through a second filter between a filtering direction and a filter flushing direction, the filter flushing direction being opposite to the filtering direction, the second filter being in the soil reservoir, and the second filter and the first filter being different filters,
wherein washing liquor flows through the first filter both in the first flow direction and in the second flow direction, and
the washing liquor flows through the second filter in both the filtering direction and the filter flushing direction.

* * * * *

UNITED STATES PATENT AND TRADEMARK OFFICE
CERTIFICATE OF CORRECTION

PATENT NO. : 8,603,255 B2  Page 1 of 1
APPLICATION NO. : 11/990318
DATED : December 10, 2013
INVENTOR(S) : Classen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 230 days.

Signed and Sealed this
Twenty-second Day of September, 2015

Michelle K. Lee
*Director of the United States Patent and Trademark Office*